United States Patent
Brunel

(10) Patent No.: US 7,277,470 B2
(45) Date of Patent: *Oct. 2, 2007

(54) MULTI-USER DETECTION IN AN MC-CDMA TELECOMMUNICATION SYSTEM

(75) Inventor: Loic Brunel, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 818 days.

This patent is subject to a terminal disclaimer.

(21) Appl. No.: 10/189,003

(22) Filed: Jul. 5, 2002

(65) Prior Publication Data

US 2003/0053527 A1  Mar. 20, 2003

(30) Foreign Application Priority Data

Jul. 5, 2001  (EP) .................................. 01401809

(51) Int. Cl.
*H04B 1/707*  (2006.01)
(52) U.S. Cl. ..................................... 375/147; 375/143
(58) Field of Classification Search ................ 375/130, 375/147, 148, 152, 316, 343, 340, 140–144, 375/346, 350
See application file for complete search history.

(56) References Cited

U.S. PATENT DOCUMENTS

| | | | | |
|---|---|---|---|---|
| 5,377,225 | A | * 12/1994 | Davis ........................... | 370/342 |
| 5,761,237 | A | * 6/1998 | Petersen et al. ............. | 375/148 |
| 6,075,792 | A | 6/2000 | Ozluturk | |
| 6,151,358 | A | * 11/2000 | Lee et al. ..................... | 375/232 |
| 6,175,588 | B1 | 1/2001 | Visotsky et al. | |
| 6,201,799 | B1 | 3/2001 | Huang et al. | |
| 6,240,099 | B1 | 5/2001 | Lim et al. | |
| 6,301,293 | B1 | 10/2001 | Huang et al. | |
| 6,614,836 | B1 | * 9/2003 | Halford et al. ............. | 375/152 |
| 6,654,408 | B1 | 11/2003 | Kadous et al. | |

(Continued)

FOREIGN PATENT DOCUMENTS

FR   2 822 568   3/2001

OTHER PUBLICATIONS

Jung et al, A Generalized View on Multicarrier CDMA Mobile Radio Systems with Joint Detection (Part II), vol. 51, No. 11-12, Nov. 1, 1997, pp. 270-275.*

(Continued)

*Primary Examiner*—Kevin Burd
(74) *Attorney, Agent, or Firm*—Oblon, Spivak, McClelland, Maier & Neustadt, P.C.

(57) ABSTRACT

A multi-user detection method and device for a receiver in a multi-carrier code division multiple access telecommunication system, each communication to or from a user of the system being coded with a signature, the signal received by said receiver being decomposed into a first plurality of frequency components The frequency components are subjected to a first filtering matched to the respective signatures of a second plurality of users and to the common or respective responses of the transmission channels associated to said communications to or from said users.

The output of the first filtering is subjected to a forward filtering followed by an estimation of the symbols transmitted to or by the users.

The estimated symbols are subjected to a backward filtering, the output of said backward filtering being subtracted from the output of the forward filtering prior to the estimation.

10 Claims, 5 Drawing Sheets

U.S. PATENT DOCUMENTS

| | | | |
|---|---|---|---|
| 6,711,219 | B2 | 3/2004 | Thomas et al. |
| 6,792,033 | B1 | 9/2004 | Maruta et al. |
| 6,907,513 | B2 * | 6/2005 | Nakanishi .................... 712/17 |
| 6,956,892 | B2 | 10/2005 | Ylitalo |
| 7,054,378 | B2 | 5/2006 | Walton et al. |
| 7,058,115 | B2 | 6/2006 | Castelain |
| 2003/0021249 | A1 | 1/2003 | Kim et al. |
| 2003/0072291 | A1 | 4/2003 | Brunel |

OTHER PUBLICATIONS

Peter Jung, et al., A Generalized View on Multicarrier CDMA Mobile Radio Systems with Joint Detection (Part I) vol. 51, No. 7-8, Jul. 1, 1997, pp. 174-185.

J.F. Helard, et al., Linear MMSE detection technique for MC-CDMA, Electronic letters, IEE Stevenage, GB, vol. 36, No. 7, Mar. 30, 2000, pp. 665-666.

PeterJung et al., A Generalized View on Multicarrier CDMA Mobile Radio Systems with Joint Detection (Part II), vol. 51, No. 11-12, Nov. 1, 1997, pp. 270-275.

Beaudals, et al., A Novel Linear MMSE Detection Technique for MC-CDMA, Electronic Letters, vol. 36, No. 7, pp. 665-666, Mar. 30, 2000.

Yee, et al., Multicarrier CDMA in Indoor Wireless Radio Networks, Proceedings of PIMRC '93, vol. 1, pp. 103-113, Sep. 8-11, 1993.

Hara, et al., Overview of Multicarrier CDMA, IEEE Communications Magazine, pp. 126-133, Dec. 1997.

Alexandra Duel-Hallen; "Equalizer for Multiple Input/Multiple Output Channels and PAM Systems with Cyclostationary Input Sequences"; IEEE Journal on Selected Areas in Communications, vol. 10, No. 3, pp. 630-639, Apr. 1992.

Thomas P. Krauss, et al.; "MMSE equalization for forward link in 3GCDMA: symbol-level versus chip-level"; Aug. 14-16, 2000, IEEE, Statistical Signal and Array Processing, 2000. Proceedings of Workshop on, 18-22.

* cited by examiner

MULTI-USER DETECTION IN AN MC-CDMA TELECOMMUNICATION SYSTEM

BACKGROUND OF THE INVENTION

1. Field of the Invention

The present invention relates to a multi-user detection method for a receiver in a multi-carrier code division multiple access system and more specifically to a multi-user detection method with multiple access interference cancellation. The present invention concerns also a MC-CDMA receiver implementing such a multi-user detection method.

2. Description of the Background Art

Multi-Carrier Code Division Multiple Access (MC-CDMA) combines OFDM (Orthogonal Frequency Division Multiplex) modulation and the CDMA multiple access technique. This multiple access technique was proposed for the first time by N. Yee et al. in the article entitled "Multicarrier CDMA in indoor wireless radio networks" which appeared in Proceedings of PIMRC'93, Vol. 1, pages 109-113, 1993. The developments of this technique were reviewed by S. Hara et al. in the article entitled "Overview of Multicarrier CDMA" published in IEEE Communication Magazine, pages 126-133, December 1997.

Unlike the DS-CDMA (Direct Sequence Code Division Multiple Access) method, in which the signal of each user is multiplied in the time domain in order to spread its frequency spectrum, the signature here multiplies the signal in the frequency domain, each element of the signature multiplying the signal of a different sub-carrier.

More precisely, FIG. 1 shows the structure of an MC-CDMA transmitter for a given user k. Let $b_k(i)$ be the $i^{th}$ symbol to be transmitted from the user k, where $b_k(i)$ belongs to the modulation alphabet. The symbol $b_k(i)$ is first of all multiplied at 110 by a spreading sequence or signature of the user, denoted $c_k(t)$, consisting of N "chips", each "chip" being of duration $T_c$, the total duration of the spreading sequence corresponding to a symbol period T. The results of the multiplication of the symbol $b_k(i)$ by the different "chips" are converted by the serial to parallel converter 120 into a block of L symbols, where L is in general a multiple of N. It will be considered, for reasons of simplification of presentation, that L=N. The block of L symbols is then subjected to an inverse fast Fourier transformation (IFFT) in the module 130. In order to prevent intersymbol interference, a guard interval, with a length greater than the duration of the pulse-type response of the transmission channel, is added to the MC-CDMA symbol. This interval is obtained by appending a suffix (denoted Δ) identical to the start of the said symbol. Before being transmitted to the parallel to serial converter 140, the symbols thus obtained are amplified at 150 in order to be transmitted over the user channel. It can therefore be seen that the MC-CDMA method can be analysed into a spreading in the spectral domain (before IFFT) followed by an OFDM modulation.

In practice, the user k transmits his data in the form of frames of I symbols, each symbol $b_k(i)$ being spread by a real signature $c_k(t)$, typically a Walsh-Hadamard signature, with a duration equal to the symbol period T, such that $c_k(t)=0$ if $t \notin [0, T[$. The signal modulated at time $t=(i-1).T+(l-1).T_c$ can then be written, if the guard intervals between MC-CDMA symbols are omitted:

$$S_k(t) = \sum_{i=1}^{I} \sum_{l=1}^{L} \omega_k \cdot c_k((l-1) \cdot T_c) \cdot b_k(i-1) \cdot \exp(j \cdot 2\pi(l-1)/L) \quad (1)$$

where $\omega_k$ is the amplitude of the signal transmitted by the user k, assumed to be constant for a transmission unit.

An MC-CDMA receiver for a given user k has been illustrated schematically in FIG. 2. This receiver is known as single-user detection receiver (or SUD receiver) because the detection takes only into account the symbols transmitted to (or from) the user in question.

The demodulated received signal is sampled at the "chip" frequency. The signal thus obtained can be written:

$$R(t) = \sum_{k=1}^{K} \sum_{i=1}^{I} \sum_{l=1}^{L} h_{kl}(i-1) \cdot \omega_k \cdot c_{kl} \cdot b_k(i-1) \cdot \exp(j \cdot 2\pi(l-1)/L) + n(t) \quad (2)$$

where K is the number of users, $c_{kl}=c_k((l-1).T_c)$, $h_{kl}(i)$ represents the response of the channel of the user k to the frequency of the subcarrier l of the MC-CDMA symbol transmitted at time i.T and where n(t) is the received noise.

If the downlink channel is considered, the transmission channels have identical characteristics and therefore $h_{kl}=h_l$.

The samples obtained by sampling at the "chip" frequency are put in parallel in a serial to parallel converter 210 and stripped from the suffix (Δ) before undergoing an FFT in the module 220.

In MC-CDMA, the presence of the guard period makes it possible to neglect the intersymbol interference. For a given subcarrier (hereinafter simply called carrier), the equalisation can therefore be performed by a single tap, i.e. by a multiplication by a complex coefficient. In the SUD receiver, the equalisation is performed carrier-by-carrier i.e. by applying one of the known equalisation methods: MRC (Maximum Ratio Combining), EGC (Equal Gain Combining), ZF (Zero Forcing) or MMSE (Minimum Mean Square Error) independently on each carrier. The equalising coefficients thus obtained are denoted $q_{k,1}, \ldots, q_{k,L}$ on FIG. 2.

The samples in the frequency domain, output from 220, are multiplied by the equalising coefficients and the signature of the user k in $240_0, \ldots, 240_{L-1}$ (for despreading) before being added in 250. The result is an estimation $\hat{b}_k(i)$ of the transmitted symbol $b_k(i)$.

The multiuser detection techniques are known notably in CDMA telecommunications systems. They have the common characteristic of taking account of the interference generated by the other users.

A multiuser detection or MUD technique for MC-CDMA was presented in the article by J-Y. Beaudais, J. F. Hélard and J. Citerne entitled "A novel linear MMSE detection technique for MC-CDMA" published in Electronics Letters, Vol. 36, No. 7, pages 665-666, 30 March 2000. The equalisation method proposed no longer operates carrier by carrier but MC-CDMA symbol by MC-CDMA symbol, taking account of all the carriers and all the signatures of the active users. For this reason it is called GMMSE (Global Minimum Mean Square Error) equalisation or, equivalently, M-MMSE (Matrix Minimum Mean Square Error) equalisation. Its purpose is to minimise the mean square error between the estimated symbols $\hat{b}_k(i)$ and the transmitted symbols $b_k(i)$.

An MC-CDMA receiver with GMMSE equalisation for a user k has been shown in FIG. 3. Its structure differs from that of FIG. 2 in that the equalisation is effected by means of a multiplication 330 by a matrix Q of the signals of the different carriers. The despread signal obtained at the output of the adder 350 gives the estimated symbol $\hat{b}_k(i)$.

Furthermore, structures of MUD MC-CDMA receivers using either a parallel interference cancellation (PIC) scheme or a serial interference cancellation scheme (SIC) have been proposed in the article by J-Y. Beaudais et al. Parallel interference cancellation consists in iteratively cancelling the multiple access interference (MAI) by subtracting for a given user the contributions due to the other users, these contributions being obtained, for a given step, by respreading the symbols estimated at the previous step and filtering them with filters modelling their respective transmission channels. In contrast, serial interference cancellation consists in successively eliminating the contributions of the users in a cascade of stages, each stage eliminating the contribution of a particular user, commencing by the contribution of highest power.

FIG. 4 illustrates the structure of a MC-CDMA receiver with parallel interference cancellation. For the sake of clarity, only the part related to a user k has been represented. In FIG. 4, r(i) denotes the output of the FFT, i.e. the vector of frequency components supplied by stage 320 in FIG. 3 at time i.T. These components are subjected to a first equalisation in 410. More precisely, 410 provides for an equalisation for the K-1 transmission channels associated with the users k'=1, . . . K, k'≠k. If we consider the downlink receiver, the transmission channels are identical, the equalisation 410 amounts to a simple multiplication by an L×L matrix and the output is a vector of dimension L. In the uplink receiver however, K-1 matrices are involved, each matrix corresponding to a transmission channel of a user. These K-1 matrices are represented by the tensor $\tilde{Q}^{(1)}$, where the index (1) stands for the first cancellation stage. After equalisation, the received MC-CDMA symbols are despread in 420 with the K-1 signatures of the users k'=1, . . . K, k'≠k. and detected in 430. This first estimation does not take into account the MAI. The detected symbols are then respread by said signatures in 440 and the MC-CDMA symbols thus obtained are filtered by K-1 filters modelling the transmission channels of the users k'. Each filter can be represented by an L×L diagonal matrix and the K-1 matrices are represented by the tensor $\tilde{H}$. Here again, if the downlink receiver is considered, the latter matrices are identical. In any case, the K-1 outputs of 450 give the respective contributions of the users k' to the MAI. They are subtracted from r(i) (delayed so as to compensate for the processing time in 410-450) in $460_1, \ldots, 460_{K-1}$. The output of $460_{K-1}$ is a version of r(i) freed of a first estimation of MAI. The process can be repeated so as to refine the estimation of the MAI and jointly improve the detection of the symbols. The last stage is followed by a classical single-user equalisation in 470, despreading in 480 and symbol detection in 490 as in FIG. 2.

The proposed parallel and serial cancellation schemes in MC-CDMA are rather complex in particular for the uplink receiver since some processing stages are performed at the carrier level and therefore involve (K-1).L operations in parallel where K is the number of users and L is the number of carriers.

BRIEF SUMMARY OF THE INVENTION

The object of the present invention is to propose a MC-CDMA receiver with multi-user detection and MAI removal which is simpler than those known from the prior art. In particular, the object of the invention is to propose a MC-CDMA receiver of said type which is simpler when the number of users is low.

The above mentioned object is attained by a multi-user detection method as claimed in appended claim 1 and a multi-user receiver as claimed in independent claim 10. Further advantages are given by the technical features recited in the dependent claims.

BRIEF DESCRIPTION OF THE DRAWINGS

The characteristics of the invention mentioned above, as well as others, will emerge more clearly from a reading of the following description given in relation to the accompanying figures, amongst which.

DETAILED DESCRIPTION OF THE INVENTION

Figure 1:
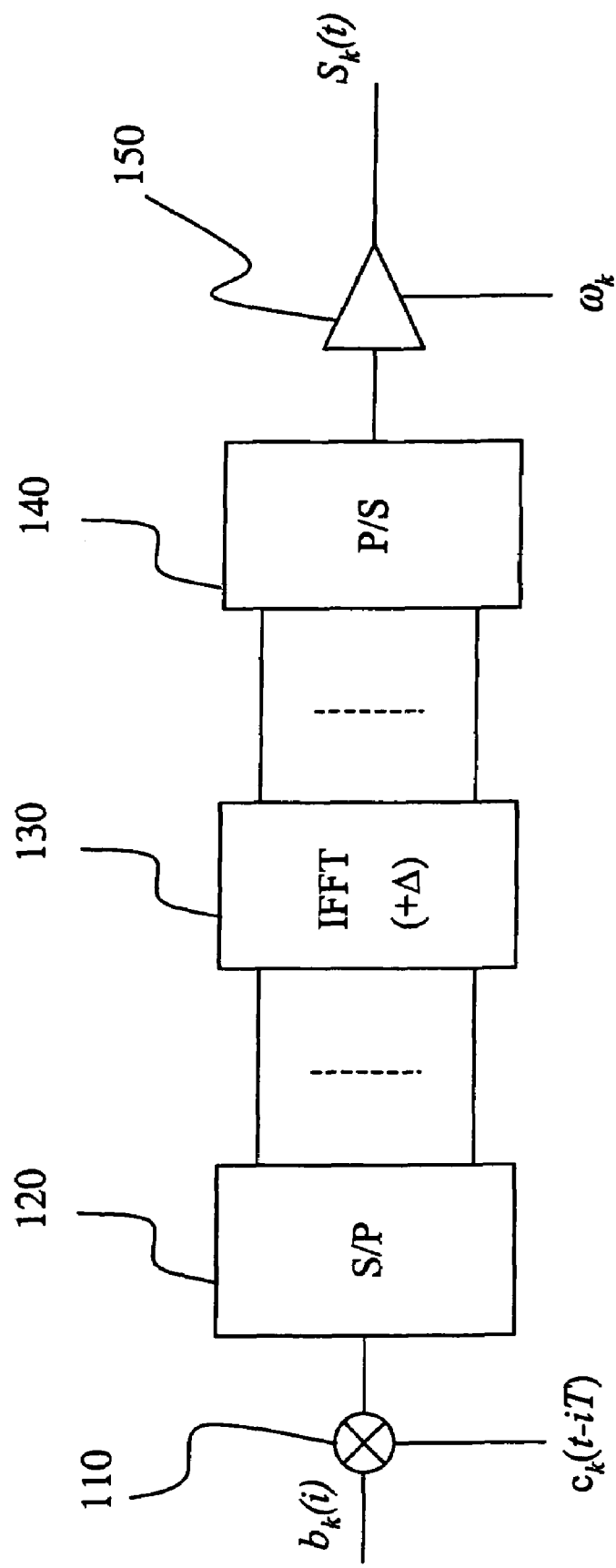
FIG. 1 depicts schematically the structure of an MC-CDMA transmitter known from the state of the art.
Figure 2:
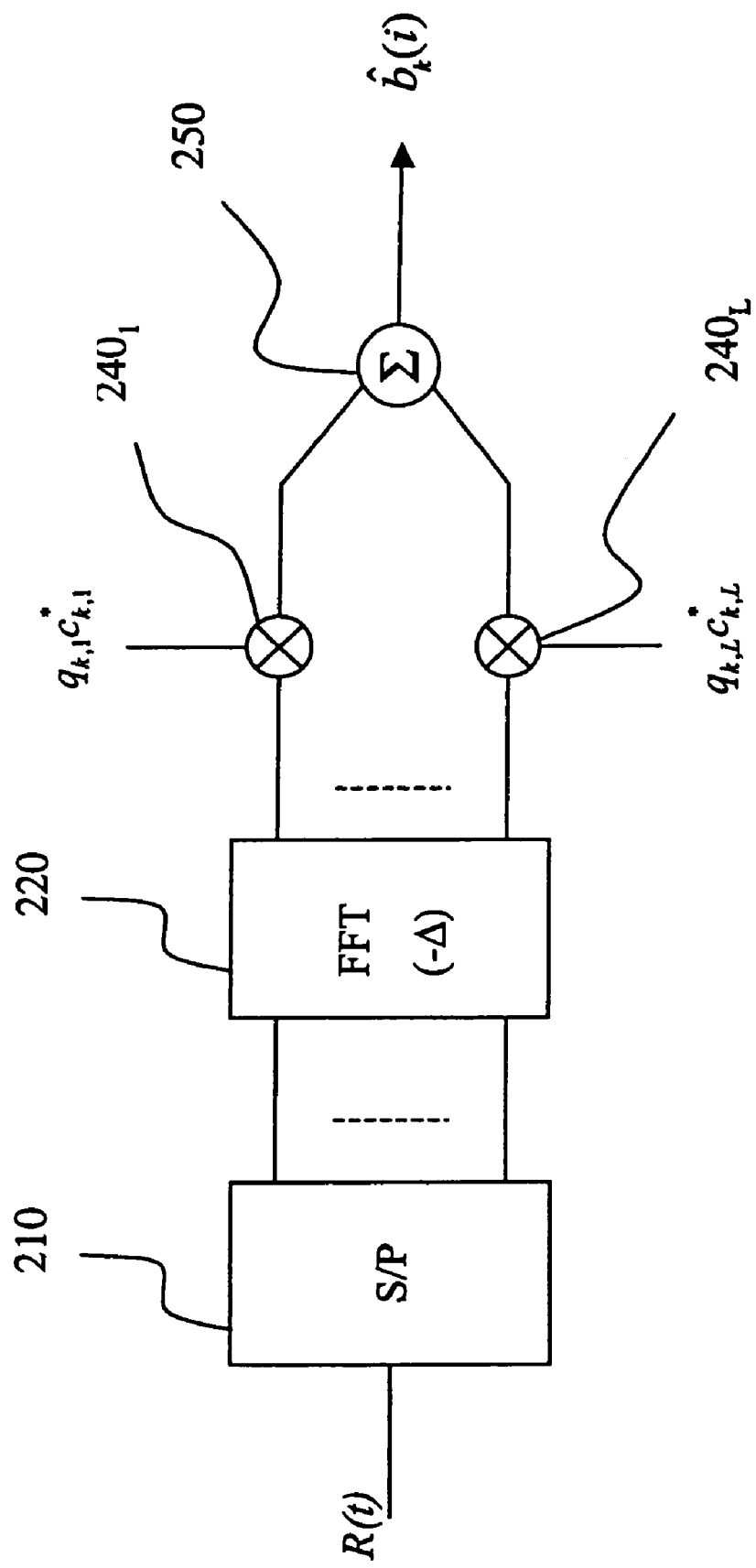
FIG. 2 depicts schematically the structure of a first MC-CDMA receiver known from the state of the art.
Figure 3:
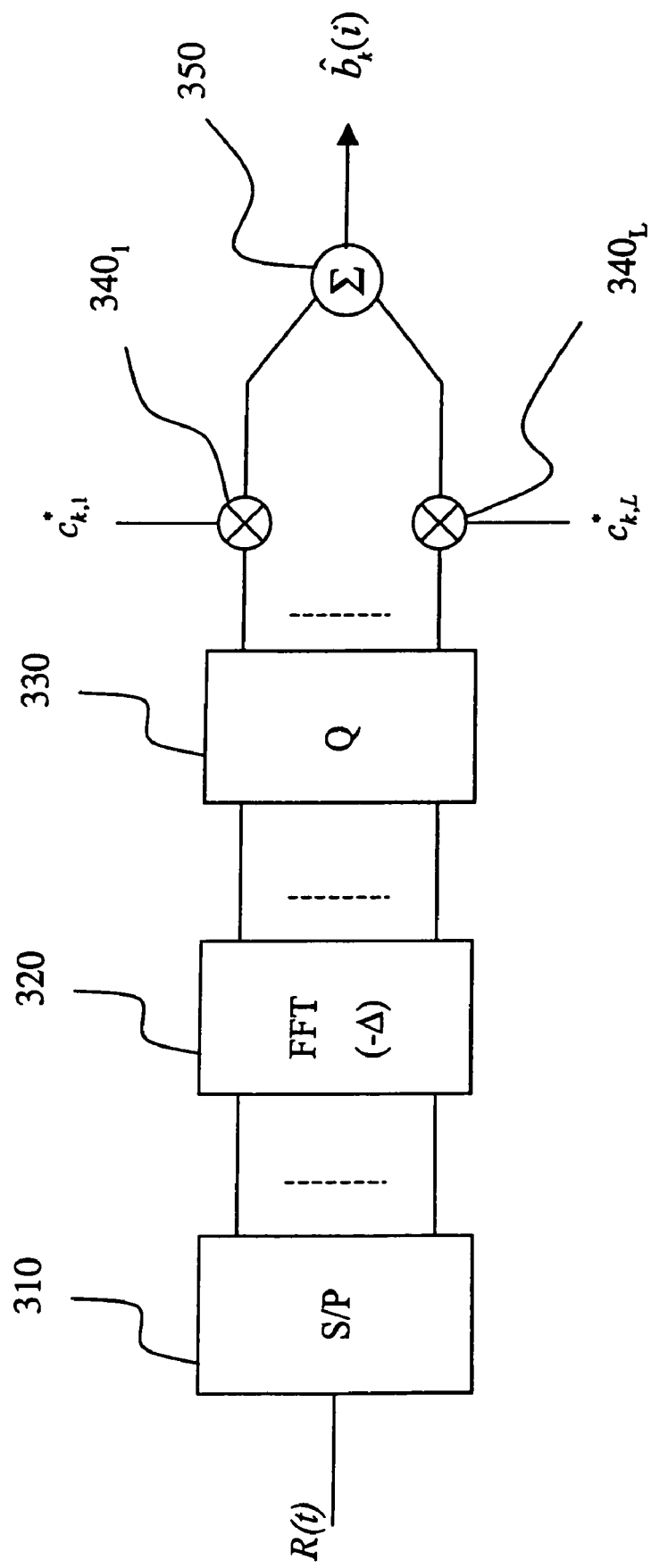
FIG. 3 depicts schematically the structure of a second MC-CDMA receiver known from the state of the art.
Figure 4:
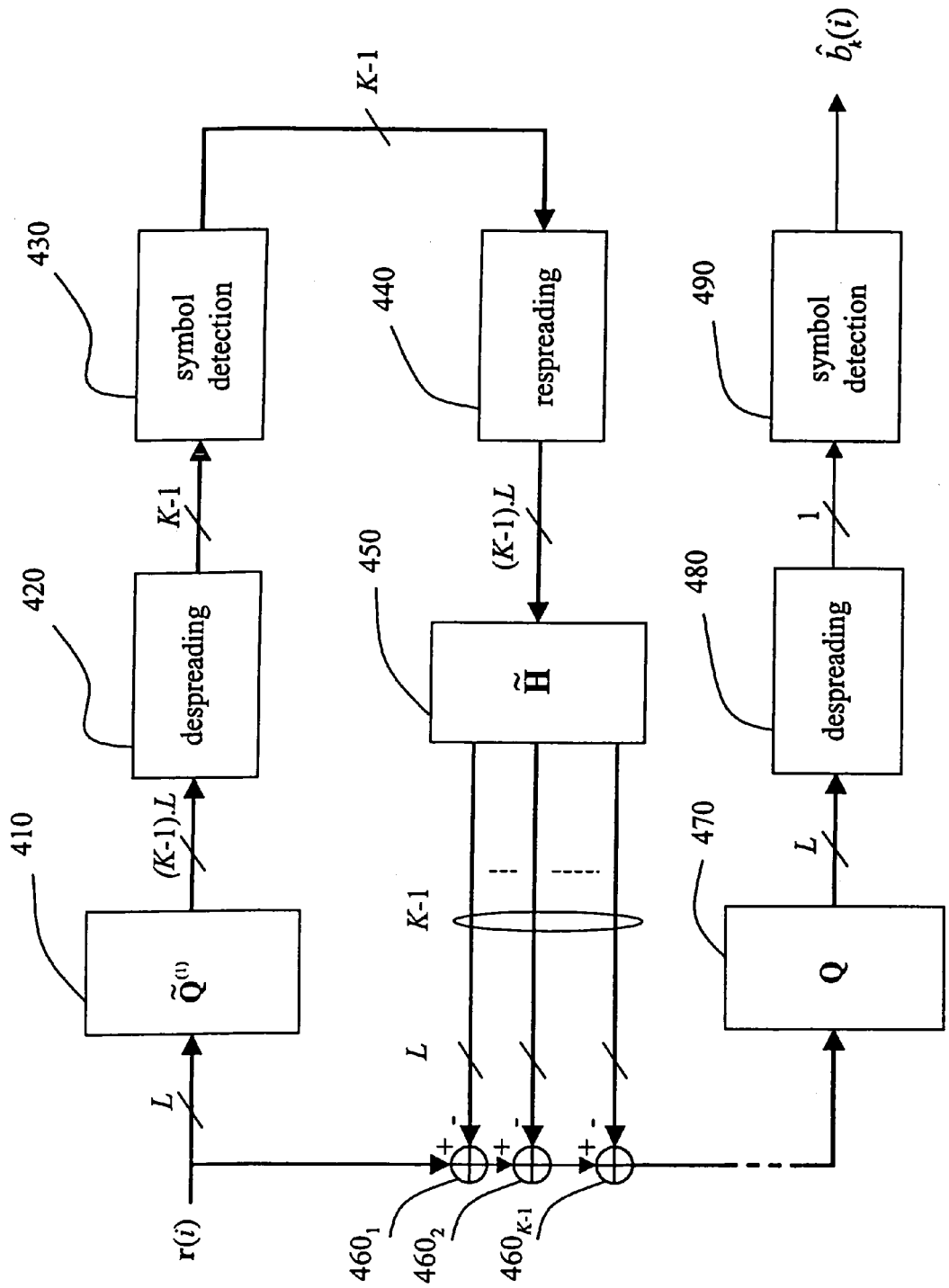
FIG. 4 depicts schematically the structure of an MC-CDMA receiver with parallel interference cancellation as known from the state of the art.

Once again the context of a MC-CDMA receiver with K users will be referred to. The L frequency components output by the FFT at time i can be regarded as a vector $r(i)=(r_1(i), \ldots, r_L(i))^T$, the expression of which can be derived from (2):

$$r(i)=C(i)D_\omega b(i)+\eta(i) \quad (3)$$

where $b(i)=(b_1(i), \ldots, b_K(i))^T$ is the vector of the K transmitted symbols, $D_\omega=\text{diag}(\omega_1, \ldots, \omega_K)$ is a diagonal matrix, the elements of which are the amplitudes $\omega_k$ of the symbols transmitted by the users, $\eta(i)=(\eta_1(i), \ldots, \eta_L(i))^T$ is the vector of the noise components on the OFDM multiplex and $$C(i) = \begin{bmatrix} c_{11}h_{11}(i) & \cdots & c_{1K}h_{1K}(i) \\ \vdots & & \vdots \\ c_{LI}h_{LI}(i) & \cdots & c_{LK}h_{LK}(i) \end{bmatrix} \quad (4)$$

is a matrix combining the effect of spreading and of channel propagation.

In the downlink, all the users share the same channel and the matrix C(i) can be expressed by $C(i)=H(i)C_D$ where $H(i)=\text{diag}(h_1(i), \ldots, h_L(i))$ and $C_D$ is the L×K matrix containing the codes of the active users:

$$C_D = (c_1 \ldots c_K) = \begin{bmatrix} c_{11} & \cdots & c_{1K} \\ \vdots & & \vdots \\ c_{L1} & \cdots & c_{LK} \end{bmatrix} \quad (5)$$

If we assume that the components of the noise $\eta(i)$ are AWGN (Additive White Gaussian Noise) with covariance matrix $E[\eta(i)\eta^H(i)] = N_0 I_L$ where $I_L$ is the L×L identity matrix, the maximum likelihood detection of the transmitted signal consists in finding the symbol b which minimises the quadratic distance $d_{Emin}^2(b)$ between the received signal and the signal expected to be received if b was transmitted. Hence, from (3), said symbol b should minimise:

$$d_E^2(b) = \|r(i) - C(i)D_\omega b\|^2 \quad (6)$$

Equivalently, since r(i) is known, said symbol b should minimise the expression:

$$d^2(b) = \|C(i)D_\omega b\|^2 - 2Re\langle C(i)D_\omega b; r(i)\rangle \quad (7)$$

where the scalar product $\langle C(i)D_\omega b; r(i)\rangle$ can be expressed:

$$\langle C(i)D_\omega b; r(i)\rangle = \sum_{k=1}^{K} \omega_k b_k^* \sum_{l=1}^{L} c_{lk}^*(i) h_{lk}^*(i) r_l(i) \quad (8)$$

Let us define $y_k(i) = \omega_k \sum_{l=1}^{L} c_{lk}^*(i) h_{lk}^*(i) r_l(i) \quad (9)$ the output of a filter matched to the signature of the user k and the propagation channel. $y_k(i)$ may also be viewed as the Maximum Ratio Combining of the components $r_l(i)$ of the received vector r(i), for user k. Equation (8) can be simply reformulated:

$$\langle C(i)D_\omega b; r(i)\rangle = \sum_{k=1}^{K} b_k^* y_k(i) \quad (10)$$

Let us denote $y(i) = (y_1(i), \ldots, y_K(i))^T$ the observation vector of the outputs $y_k(i)$ for the K users. According to (7) and (10), the vector y(i) represents a sufficient statistic for the maximum likelihood detection of the transmitted vector b(i).

It is important to note, that using y(i) instead of r(i) for the multiuser detection advantageously reduces the observation dimension from L to K. The observation vector y(i) may be written in a matrix form from equation (9):

$$y(i) = D_\omega C^H(i) r(i) \quad (11)$$

where $\bullet^H$ denotes the transpose-conjugate. By replacing expression (3) in expression (11), the observation y(i) can be obtained as a function of the transmitted vector b(i):

$$y(i) = D_\omega C^H(i) C(i) D_\omega b(i) + n(i) = R(i)b(i) + n(i) \quad (12)$$

where $$R(i) = D_\omega C^H(i) C(i) D_\omega$$

and $$E[n(i)n^H(i)] = N_0 R(i)$$

It has been described in French patent application FR0104050 filed by the Applicant on 22.03.2001 and included hereinafter by reference a multiuser detection method based on Wiener filtering of the observation vector y(i). According to this method, the vector of the estimated symbols $\hat{b}(i) = (\hat{b}_1(i), \ldots, \hat{b}_K(i))_T$ is obtained from:

$$\hat{b}(i) = Fy(i) \quad (13)$$

where the matrix F is given by the Wiener-Hopf formula:

$$F = R_{by} R_{yy}^{-1} \quad (14)$$

and where $R_{by}$, $R_{yy}$ are the covariance matrix of b and y and the autocovariance of y respectively.

The basic idea underlying the invention is to propose a decision-feedback detector cancelling the interference corresponding to the already detected symbols of the other users. As further explained, this interference cancellation is made at the symbol level and not at the carrier level.

Figure 5:
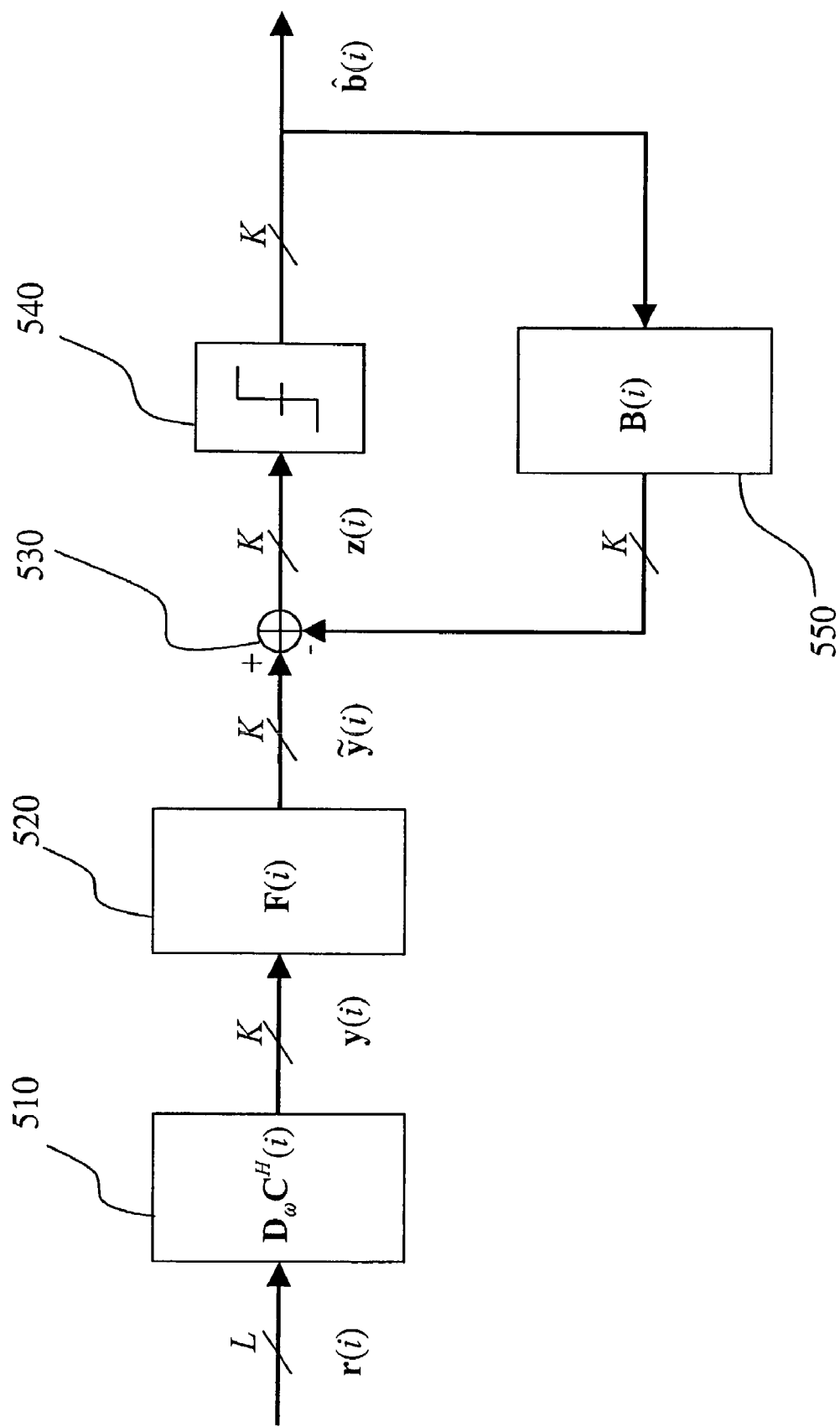
FIG. 5 depicts schematically the structure of an MC-CDMA receiver with decision feedback multi-user detection according to the invention.

The structure of the decision-feedback detector according to the invention is illustrated in FIG. 5. The detector comprises a filter 510 matched to the signatures of the users and to the response(s) of the propagation channel(s) (the plural stands for the uplink). The filter 510 multiplies the vector r(i) of the frequency components by the matrix $D_\omega C^H(i)$ in order to output the observation vector y(i) according to equation (11). The detector comprises also a forward filter 520 and a backward filter 550. The forward filter performs a multiplication of the observation vector y(i) by a matrix F(i) while the backward filter performs a multiplication of the vector $\hat{b}(i)$ of the estimated symbols by a matrix B(i). The backward filter is causal within the meaning of multi-user detection (only the contribution of the already detected symbols of the other users are cancelled), i.e. the matrix B(i) is strictly lower triangular. The output of the backward filter is subtracted from the output of the forward filter in 530 to give a new observation vector:

$$z(i) = F(i)y(i) - B(i)\hat{b}(i) \quad (15)$$

which is substantially freed from MAI. The symbols for the different users are estimated from the observation vector z(i) in estimating means 540. The vector $\hat{b}(i)$ of the estimated symbols is supplied to the backward filter 550.

According to a first embodiment of the invention, the matrices F(i) and B(i) are chosen to meet a zero-forcing (ZF) criterion.

The Cholesky factorisation of the hermitian matrix R(i) gives:

$$R(i) = L^H(i) L(i) \quad (16)$$

where L(i) is a lower triangular matrix. Let now $\tilde{y}(i)$ be defined as $\tilde{y}(i) = L^{-H}(i) y(i)$ where the notation $L^{-H}(i)$ stands for $(L^H(i))^{-1}$. From (12) we have therefore:

$$\tilde{y}(i) = L(i)b(i) + \tilde{n}(i) \quad (17)$$

Since $E[\tilde{n}(i)\tilde{n}^H(i)] = N_0 I_K$ the observation vector y(i) has been whitened by the multiplication by $L^{-H}(i)$. L(i) being lower triangular, user k is only disturbed by the interference coming from the already detected users 1 to k-1, i.e. the components of $\tilde{y}(i)$ can be expressed as:

$$\tilde{y}_k(i) = L_{kk}(i)b_k(i) + \sum_{k'=1}^{k-1} L_{kk'}(i)b_{k'}(i) + \tilde{n}_k(i) \quad (18)$$

If we choose:

$$F(i)=L^{-H}(i) \quad (19)$$

$$B(i)=L(i)-\mathrm{diag}(L(i))$$

we have:

$$z(i)=\tilde{y}(i)-(L(i)-\mathrm{diag}(L(i)))\hat{b}(i) \quad (20)$$

and therefore:

$$z_k(i) = \tilde{y}(i) - \sum_{k'=1}^{k-1} L_{kk'}(i)\hat{b}_{k'}(i) = L_{kk}(i)b_k(i) + \tilde{n}_k(i) \quad (21)$$

where we have assumed that the estimated symbols up to k-1 are correct i.e. $\hat{b}_{k'}(i)=b_{k'}(i)$ for k'=1, ..., k-1.

Since the $z_k(i)$ are completely decorrelated, a detection freed from the influence of MAI is achieved in 540.

According to a second embodiment of the invention, the matrices F(i) and B(i) are chosen to meet a MMSE criterion.

Let $\epsilon(i)=z(i)-b(i)$ be the error between the observation vector and the vector of the transmitted symbols. The purpose of the MMSE criterion is to minimise the mean square of this error:

$$J=E[|\epsilon(i)|^2]=\mathrm{Trace}E[\epsilon(i)\epsilon^H(i)] \quad (22)$$

If we develop, $\epsilon(i)\epsilon^H(i)=(z(i)-b(i))(z(i)-b(i))^H$, the second term of the equation can be written:

$$\begin{aligned}(F(i)y(i)-B(i)\hat{b}(i)-b(i))(F(i)y(i)-B(i)\\ \hat{b}(i)-b(i))^H=((F(i)R(i)-I_K)b(i)-B(i)\hat{b}(i)+F(i)n(i))\\ ((F(i)R(i)-I_K)b(i)-B(i)\hat{b}(i)+F(i)n(i))^H\end{aligned} \quad (23)$$

Assuming that the transmitted symbols are not correlated, that the detected symbols are correct and that the modulation is of normalised power, we have:

$$E[\hat{b}(i)\hat{b}^H(i)]\approx I_K \quad (24)$$

$$E[\hat{b}(i)b^H(i)]\approx I_K$$

and:

$$E[b(i)b^H(i)]=I_K \quad (25)$$

Bearing in mind that $E[n(i)n^H(i)]=N_0R(i)$, we obtain from (23), (24) and (25):

$$\begin{aligned}E[\epsilon(i)\epsilon^H(i)]=(F(i)R(i)-I_K)(F(i)R(i)-I_K)^H+B(i)B^H(i)+\\ N_0F(i)R(i)F^H(i)-(F(i)R(i)-I_K)B^H(i)-B(i)(F(i)R\\(i)-I_K)^H\end{aligned} \quad (26)$$

From (22) and (26) we calculate the gradient of J as a function of F(i):

$$\mathrm{grad}(J)=(F(i)R(i)-I_K)^*R^T(i)+N_0F^*(i)R^T(i)-B^*(i)R^T(i) \quad (27)$$

In order to minimise J, we must have:

$$\begin{aligned}\mathrm{grad}(J)=0 \Leftrightarrow F^*(i)(N_0R^T(i)+R^*(i)R^T(i))=(I_K+B^*(i)R^T(i))\\ \Leftrightarrow F(i)=(I_K+B(i))(N_0I_K+R(i))^{-1}\end{aligned} \quad (28)$$

The criterion being minimised with respect to F(i), the lower triangular matrix B(i) which minimises the criterion remains to be found. Replacing (28) into (26), we obtain:

$$E[\epsilon(i)\epsilon^H(i)]=N_0(I_K+B(i))(N_0I_K+R(i))^{-1}(I_K+B(i))^H \quad (29)$$

The zero value of the gradient does not guarantee that B(i) is a lower triangular matrix. In order to verify that this condition is met, the following Cholesky decomposition may be used:

$$N_0I_K+R(i)=L_{N_0}{}^H L_{N_0} \quad (30)$$

where $L_{N_0}$ is lower triangular. If we replace (30) into (29), we obtain:

$$\begin{aligned}E[\epsilon(i)\epsilon^H(i)]=N_0(I_K+B(i))L_{N_0}^{-1}L_{N_0}^{-H}(I_K+B(i))^H\\ =N_0L'L'^H\end{aligned} \quad (31)$$

where $L'=(I_K+B(i))L_{N_0}^{-1}$ is lower triangular. Hence, $$\mathrm{Trace}\, E[\epsilon(i)\epsilon^H(i)] = \quad (32)$$

$$N_0\,\mathrm{Trace}(L'L'^H) = N_0\sum_{i=1}^{K}\sum_{j=1}^{i}|L'_{ij}|^2 \geq N_0\sum_{i=1}^{K}L'^2_{ii} =$$

$$N_0\sum_{i=1}^{K}\left((1+0)(L_{N_0}^{-1})_{ii}\right)^2 = N_0\sum_{i=1}^{K}(L_{N_0})_{ii}^{-2}$$

since B(i) is assumed strictly lower triangular. If we choose:

$$B(i)=\mathrm{diag}^{-1}\{L_{N_0}\}L_{N_0}-I_K \quad (33)$$

where the notation $\mathrm{diag}^{-1}\{L_{N_0}\}$ stands for $(\mathrm{diag}(L_{N_0}))^{-1}$ we obtain:

$$\begin{aligned}E[\epsilon(i)\epsilon^H(i)]=N_0\mathrm{diag}^{-1}\{L_{N_0}\}L_{N_0}L_{N_0}^{-1}L_{N_0}^{-H}L_{N_0}^{H}\mathrm{diag}^{-H}\{L_{N_0}\}=N_0\mathrm{diag}^{-2}\{L_{N_0}\}\end{aligned} \quad (34)$$

and, consequently, $$\mathrm{Trace}\,(E[\epsilon(i)\epsilon^H(i)]) = N_0\sum_{i=1}^{K}(L_{N_0})_{ii}^{-2} \quad (35)$$

which is indeed the minimum of $\mathrm{Trace}E[\epsilon(i)\epsilon^H(i)]$ according to (32).

Replacing the expression (33) into (28), we get the matrices of the forward and backward filters for the MMSE decision-feedback detection:

$$F(i)=\mathrm{diag}^{-1}\{L_{N_0}\}L_{N_0}^{-H} \quad (36)$$

$$B(i)=\mathrm{diag}^{-1}\{L_{N_0}\}L_{N_0}-I_K$$

More generally, F(i) and B(i) can be chosen proportional to the expressions given in (36).

If the symbols $b_k(i)$ are QPSK modulated, the following matrices can alternatively be chosen:

$$F(i)=L_{N_0}^{-H} \quad (37)$$

$$B(i)=L_{N_0}-\mathrm{diag}\{L_{N_0}\}$$

Indeed, by replacing the expressions (36) in (15), we obtain:

$$z(i)=\mathrm{diag}^{-1}\{L_{N_0}\}(L_{N_0}^{-H}y(i)-(L_{N_0}-\mathrm{diag}^{-1}\{L_{N_0}\})\hat{b}(i)) \quad (38)$$

The detection of QPSK symbols is based on the signs of their respective real and imaginary parts. Since the terms of the diagonal matrix $\text{diag}^{-1}\{L_{N_0}\}$ are real positive, it suffices to consider the term in brackets for the detection.

However, if soft values are to be used after decision-feedback detection or if other types of modulation are employed, the factor $(L_{N_0})_{ii}^{-1}$ introduced by expression (36) for each user k must be taken into account.

The first and second embodiments of the invention both achieve MAI cancellation at the symbol level instead of operating at the carrier level. This significantly reduces the complexity of implementation, especially when the number of active users is less than the number of carriers in the OFDM multiplex.

Both embodiments apply equally to downlink and uplink receivers, the filter 510 having a simpler structure for the downlink.

Although the multi-user detection device for an MC-CDMA receiver according to the invention has been described in terms of functional modules e.g. filters or estimating means, it goes without saying that all or part of this device can be implemented by means of a single processor either dedicated for fulfilling all the functions depicted or in the form of a plurality of processors either dedicated or programmed for each fulfilling one or some of said functions.

The invention claimed is:

1. A multi-user detection method for a receiver in a multi-carrier code division multiple access telecommunication system, each communication to or from a user of the system being coded with a signature, the signal received by said receiver being decomposed into a first plurality (L) of frequency components corresponding to a first plurality (L) of carriers, comprising:
   subjecting said first plurality (L) of frequency components to a first filtering matched to the respective signatures of a second plurality (K) of users and to common or respective responses of the transmission channels associated to said communications to or from said users, where K is less than L,
   subjecting the output of said first filtering to a forward filtering followed by an estimation of the symbols transmitted to or by said users,
   subjecting said estimated symbols to a backward filtering, the output of said backward filtering being subtracted from the output of said forward filtering prior to said estimation.

2. The multi-user detection method of claim 1 wherein said backward filtering comprises a multiplication by a strictly lower triangular matrix, named backward matrix, of a second plurality of estimated symbols respectively transmitted to or by said second plurality (K) of users.

3. The multi-user detection method of claim 2, wherein said forward filtering comprises a multiplication by a K×K matrix, named forward matrix, where K is the value of said second plurality.

4. The multi-user detection method of claim 3, wherein said forward matrix is derived from a matrix R having the form $R=G.G^H$ with $G=D.C^H$ where D is a diagonal matrix indicating the relative amplitudes of the symbols transmitted to or by said users, C is a matrix characteristic of the signatures of said users and of said transmission channels, $.^H$ is the transpose conjugate.

5. The multi-user detection method of claim 4, wherein said forward matrix is obtained by a Cholesky factorisation of said matrix R giving a lower triangular matrix L such that $R=L^H.L$, said forward matrix being chosen equal to $(L^H)^{-1}$ and said backward matrix being chosen equal to L-diag(L) where diag(L) is the diagonal matrix constituted by the diagonal elements of L.

6. The multi-user detection method of claim 4, wherein said forward matrix is obtained by a Cholesky factorisation of the matrix $R+N_O I_K$ where $N_O$ is the noise power and $I_K$ is the K×K identity matrix, said Cholesky factorisation giving a lower triangular matrix $L_{NO}$ such that $R+N_O I_K = L^H_{NO}.L_{NO}$, said forward matrix being chosen proportional to $\{\text{diag}(L_{NO})\}^{-1}.\{L^H_{NO}\}^{-1}$ and said backward matrix being chosen proportional to $\{\text{diag}(L_{NO})\}^{-1}.L_{NO}-I_K$ where $\text{diag}(L_{NO})$ is the diagonal matrix constituted by the diagonal elements of $L_{NO}$.

7. The multi-user detection method of claim 4, wherein, said transmitted symbols being issued from a QPSK modulation, said forward matrix is obtained by a Cholesky factorisation of the matrix $R+N_O I_K$ where $N_O$ is the noise power and $I_K$ is the K×K identity matrix, said Cholesky factorisation giving a lower triangular matrix $L_{NO}$ such that $R+N_O I_K = L^H_{NO}.L_{NO}$, said forward matrix being chosen proportional to $\{L^H_{NO}\}^{-1}$ and where and said backward matrix being chosen proportional to $L^H_{NO}\text{-daig}(L_{NO})$ where $\text{diag}(L_{NO})$ is the diagonal matrix constituted by the diagonal elements of $L_{NO}$.

8. The multi-user detection method of claim 7, wherein said first filtering consists in a multiplication of said frequency components by said diagonal matrix D and by said matrix $C^H$.

9. The multi-user method of claim 8, wherein said matrix C is chosen equal to:

$$C = \begin{bmatrix} c_{11}h_{11} & \cdots & c_{1K}h_{1K} \\ \vdots & & \vdots \\ c_{L1}h_{L1} & \cdots & c_{LK}h_{LK} \end{bmatrix}$$

where the coefficients $c_{lk}$, $l=1,\ldots,L$ are e coefficients of the signature coding the communication to or from user $k=1,\ldots,K$ and $h_{lk}$, $l=1,\ldots,L$ are coefficients representing the frequency response of the channel used by said communication at the different carrier frequencies.

10. A multi-user receiver for a multi-carrier code division multiple access telecommunication system, each communication to or from a user of the system being coded with a signature, the signal received by said receiver being decomposed into a first plurality (L) of frequency components corresponding to a first plurality (L) of carriers, comprising:
   means for subjecting said first plurality (L) of frequency components to a first filtering matched to the respective signatures of a second plurality (K) of users and to common or respective responses of the transmission channels associated to said communications to or from said users, where K is less than L,
   means for subjecting the output of said means for first filtering to a forward filtering followed by an estimation of the symbols transmitted to or by said users to create estimated symbols,
   means for subjecting said estimated symbols to a backward filtering, the output of said means for backward filtering being subtracted from the output of said forward filtering prior to said estimation by said means for estimating.

* * * * *